United States Patent
Weidmann et al.

(10) Patent No.: US 6,844,558 B1
(45) Date of Patent: Jan. 18, 2005

(54) MATERIAL MEASURE AND POSITION MEASURING DEVICE COMPRISING SUCH A MATERIAL MEASURE

(75) Inventors: Josef Weidmann, Grassau (DE); Peter Speckbacher, Kirchweidach (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 165 days.

(21) Appl. No.: 10/130,631
(22) PCT Filed: Nov. 11, 2000
(86) PCT No.: PCT/EP00/11168
§ 371 (c)(1), (2), (4) Date: Sep. 24, 2002
(87) PCT Pub. No.: WO01/38829
PCT Pub. Date: May 31, 2001

(30) Foreign Application Priority Data

Nov. 19, 1999 (DE) .......................... 199 55 618

(51) Int. Cl.⁷ ................................................ G01J 1/58
(52) U.S. Cl. ............................... 250/459.1; 250/458.1; 250/484.4
(58) Field of Search .......................... 250/459.1, 458.1, 250/484.4, 271, 282

(56) References Cited

U.S. PATENT DOCUMENTS

| | | | | |
|---|---|---|---|---|
| 3,591,805 A | * | 7/1971 | Schoeffel .................. 250/458.1 |
| 4,354,739 A | * | 10/1982 | Scanlon et al. ............. 359/359 |
| 4,661,697 A | | 4/1987 | Takahashi et al. |
| 4,937,453 A | * | 6/1990 | Nelson .................. 250/370.09 |
| 5,041,326 A | * | 8/1991 | Schroeder et al. .......... 428/161 |
| 6,410,167 B2 | * | 6/2002 | Ishibashi et al. ............ 428/690 |
| 6,666,214 B2 | * | 12/2003 | Canham ...................... 128/899 |
| 2002/0096688 A1 | * | 7/2002 | Canham et al. ............. 257/103 |
| 2002/0139936 A1 | * | 10/2002 | Dumas ..................... 250/458.1 |
| 2003/0129764 A1 | * | 7/2003 | Armstrong et al. ......... 436/172 |

FOREIGN PATENT DOCUMENTS

| | | |
|---|---|---|
| DE | 1 227 246 | 10/1966 |
| DE | 33 05 129 | 9/1983 |
| JP | 3-261596 | 11/1991 |
| JP | 5-12503 | 1/1993 |
| JP | 7-296417 | 11/1995 |

OTHER PUBLICATIONS

A.G. Cullis et al., "The Structural and Luminescence Properties of Porous Silicon," Journal of Applied Physics, Aug. 1, 1997, pp. 909 to 965 (American Institute of Physics 1997).

* cited by examiner

Primary Examiner—David Porta
Assistant Examiner—Christine Sung
(74) Attorney, Agent, or Firm—Kenyon & Kenyon

(57) ABSTRACT

A material measure includes a carrier substrate having a surface that includes at least one track having first porous subsections and second subsections. The first porous subsections and the second subsections are arranged alternatingly in at least one direction and have different optical properties. The first porous subsections are formed so as to be photoluminescent and the second subsections are formed so as to be non-photoluminescent. A scanning unit may also be provided, wherein the scanning unit is movable relative to the material measure and includes at least one optoelectronic detector element and a light source. The light source applies radiation of a defined wavelength to the material measure, the radiation from the light source being suitable for exciting the photoluminescence in the first subsections of the material measure.

15 Claims, 4 Drawing Sheets

MATERIAL MEASURE AND POSITION MEASURING DEVICE COMPRISING SUCH A MATERIAL MEASURE

FIELD OF THE INVENTION

The present invention relates to a material measure as well as to a position measuring device having such a material measure.

BACKGROUND INFORMATION

Optical, incident-light position measuring devices usually include a material measure as well as a scanning unit that is movable relatively thereto. Typically arranged at the scanning unit is a light source, which emits a light bundle in the direction of the material measure. From there, the light bundle is reflected back in the direction of the scanning unit, where the light bundle, which is modulated in dependence upon displacement, passes through, as the case may be, one or more graduated-scale scanning structures, and is ultimately measured by an opto-electronic detector system. The signals generated in this manner and modulated in dependence upon displacement are then further processed via a downstream evaluation unit.

Conventional material measures include a substrate material on which alternating subsections having different optical characteristics are arranged. In the case of incident light, the first and second subsections having different reflection characteristics alternate. In the case of an incremental graduation, the configuration of the various subsections extend in the measuring direction. For example, it may be provided to produce subsections of high and low reflectivity on a glass substrate. Alternatively, steel is also used as a substrate material, on which subsections having high and low reflectivity are likewise formed. In this connection, the subsections of high reflectivity may be made of gold, while in the subsections of lower reflectivity, the steel surface is etched to be dull, so that the light impinging there is absorbed or diffusely reflected.

Problems result in the case of the above-described position measuring devices from the influence of scattered light, i.e., from radiation that travels directly from the light source to the detector elements without being modulated by the appropriate material measure. The modulation degree of the scanning signals is reduced by such scattered light.

Such problems are able to be at least partially avoided by using a material measure having photoluminescent subsections as described in German Published Patent Application No. 1 227 246, for example. Radiation having the respective photoluminescence wavelength reaches the detector elements in this context. However, the excitation wavelength differs from this radiation and does not further influence the position determination. However, the foregoing does not provide any further information regarding the concrete development of the material measure, in particular the development of the photoluminescent subsections. Furthermore, it is not yet reliably ensured that no scattered light from the light source reaches the detector elements.

SUMMARY

Therefore, it is an object of the present invention to provide a suitable development of a photoluminescent material measure for a position measuring device.

Furthermore, a position measuring device is to be provided for which the discussed scattered light problems are minimized.

In accordance with one example embodiment of the present invention, a material measure is provided that includes a carrier substrate having at least one track with alternating first and second subsections. The first subsections in this context have a porous and photoluminescent configuration, and the second subsections do not have a photoluminescent configuration. In the case of excitation by radiation of a suitable wavelength, the first subsections emit radiation having a wavelength that differs from the excitation wavelength. Only the radiation emitted by the first subsections reaches the detector elements of the corresponding position measuring device, as a result of, for example, suitable filter elements in the scanning beam path. As a result, it may be ensured that only radiation from the material measure of the present invention reaches the detector elements, i.e., the abovementioned scattered light problems may be avoided.

With regard to the configuration of the first porous and photoluminescent subsections, there are different possibilities. Consequently, when using silicon as the carrier substrate material, these subsections may be formed as porous silicon having known photoluminescent properties. Alternatively, the individual porous subsections in the carrier substrate material may also be provided with a suitable luminescent dye.

In the material measure of the present invention and in the position measuring device of the present invention, the photoluminescent subsections consequently act as discrete, incoherent, and diffuse light sources that are excited by a suitable light source in the scanning unit.

In addition to the indicated scattered light minimization, other advantages may result from using silicon as the carrier substrate material. Therefore, the high mechanical durability of the silicon carrier substrate may be specified in this context. Furthermore, the silicon carrier substrate is structurally stable and no longer changes, i.e., no undesirable diffusion processes may result. Moreover, silicon possesses defined thermal expansion characteristics, which may be significant for high-precision applications in the semiconductor industry. It should also be mentioned that, as a substrate material, silicon is available inexpensively in a defined state, i.e., in a stable quality with respect to impurities and surface quality. Also noted in this connection is the relatively easy processability of this material.

In the case of using silicon carrier substrates, the generation of subsections having photoluminescent properties also proves to be uncomplicated in terms of process engineering when the subsections are formed as porous silicon regions.

Furthermore, it is possible to use the material measure of the present invention in linear measuring systems as well as in rotary measuring systems or two-dimensional measuring systems, etc.

The position measuring device of the present invention may have various configurations, e.g., as a two-grating encoder, three-grating encoder, etc.

Further advantages of the present invention and details pertaining thereto are derived from the following description and the drawings.

DETAILED DESCRIPTION

Figure 1:
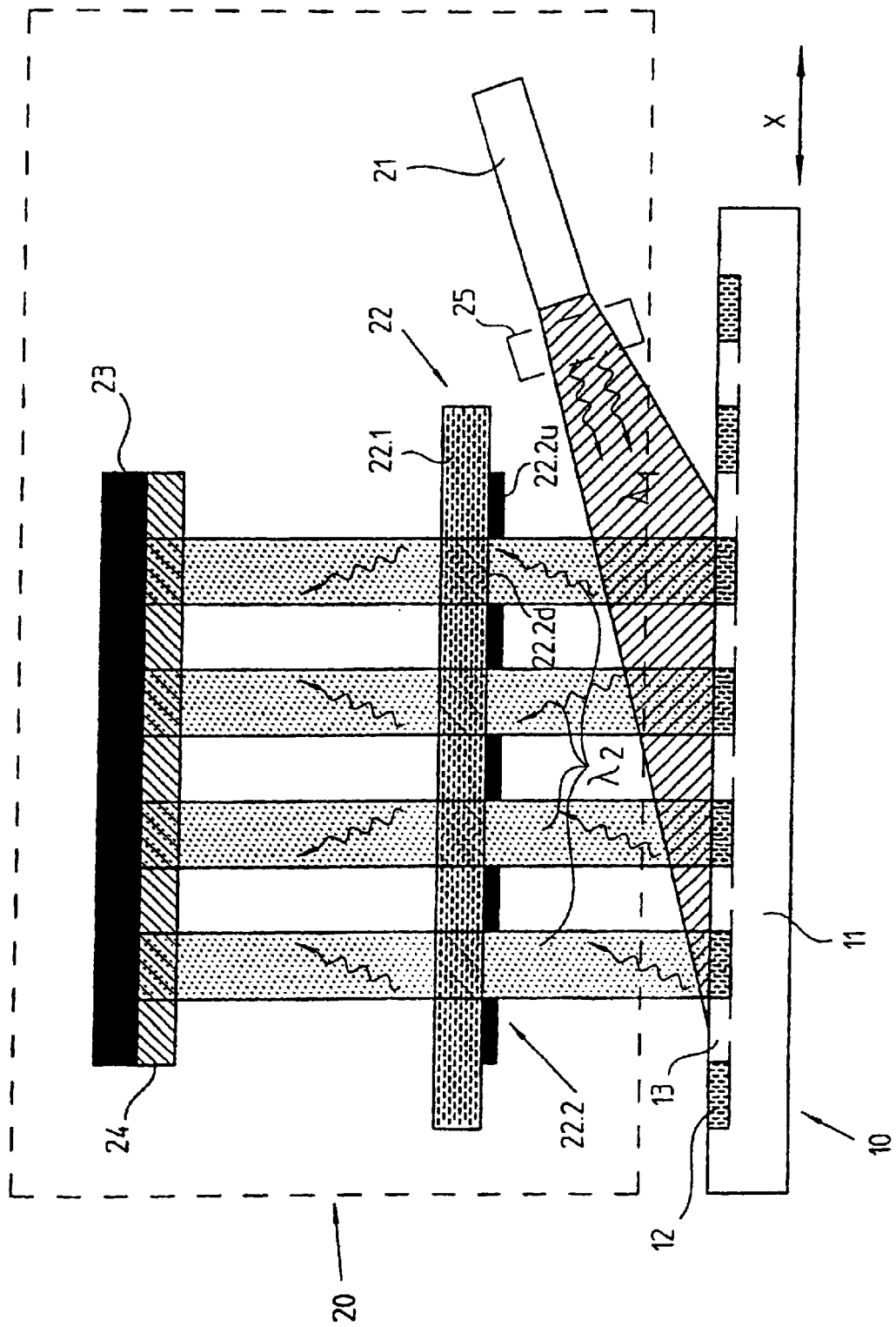
FIG. 1 is a schematic view of the scanning beam path of an example embodiment of the position measuring device that includes the material measure of the present invention.
Figure 2:
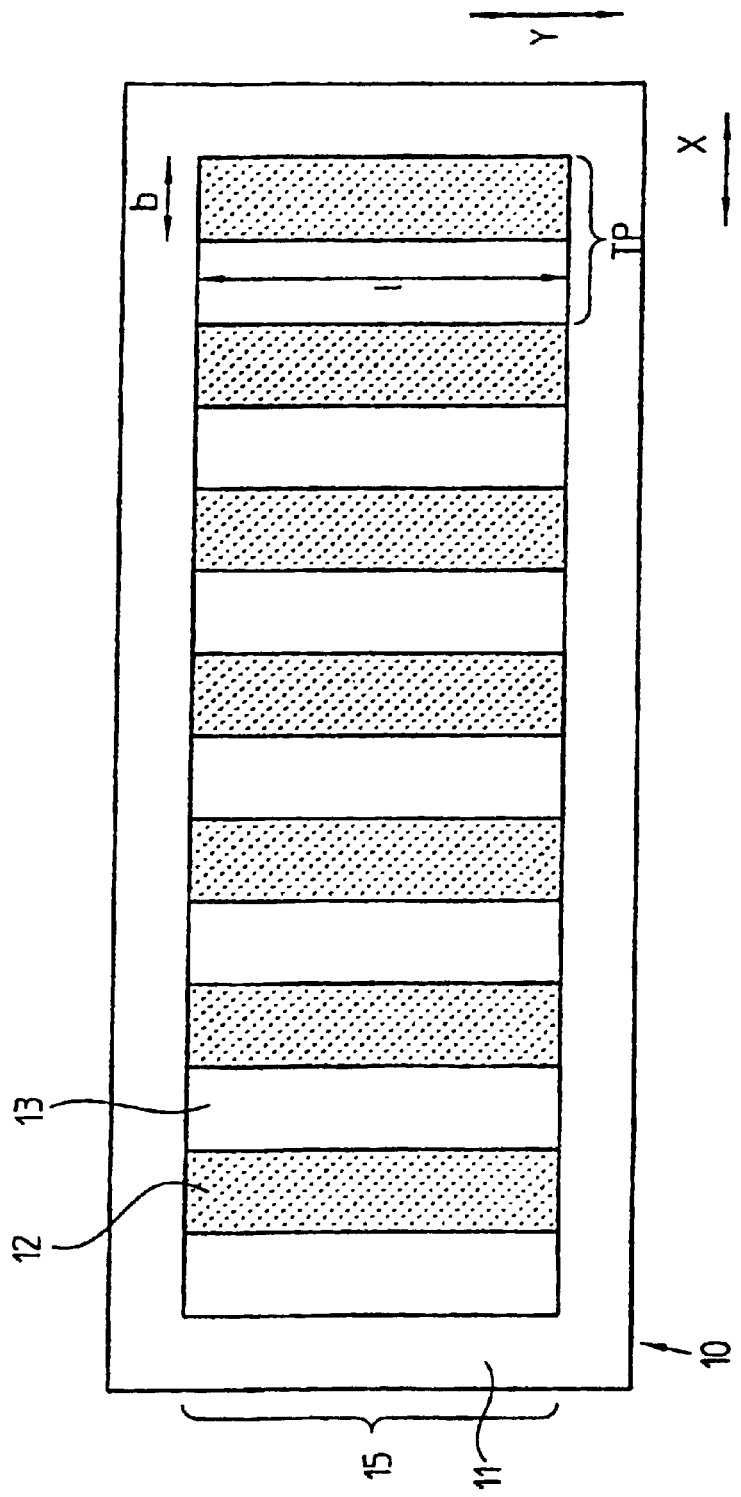
FIG. 2 is a top view of the material measure illustrated in FIG. 1.
Figure 3:
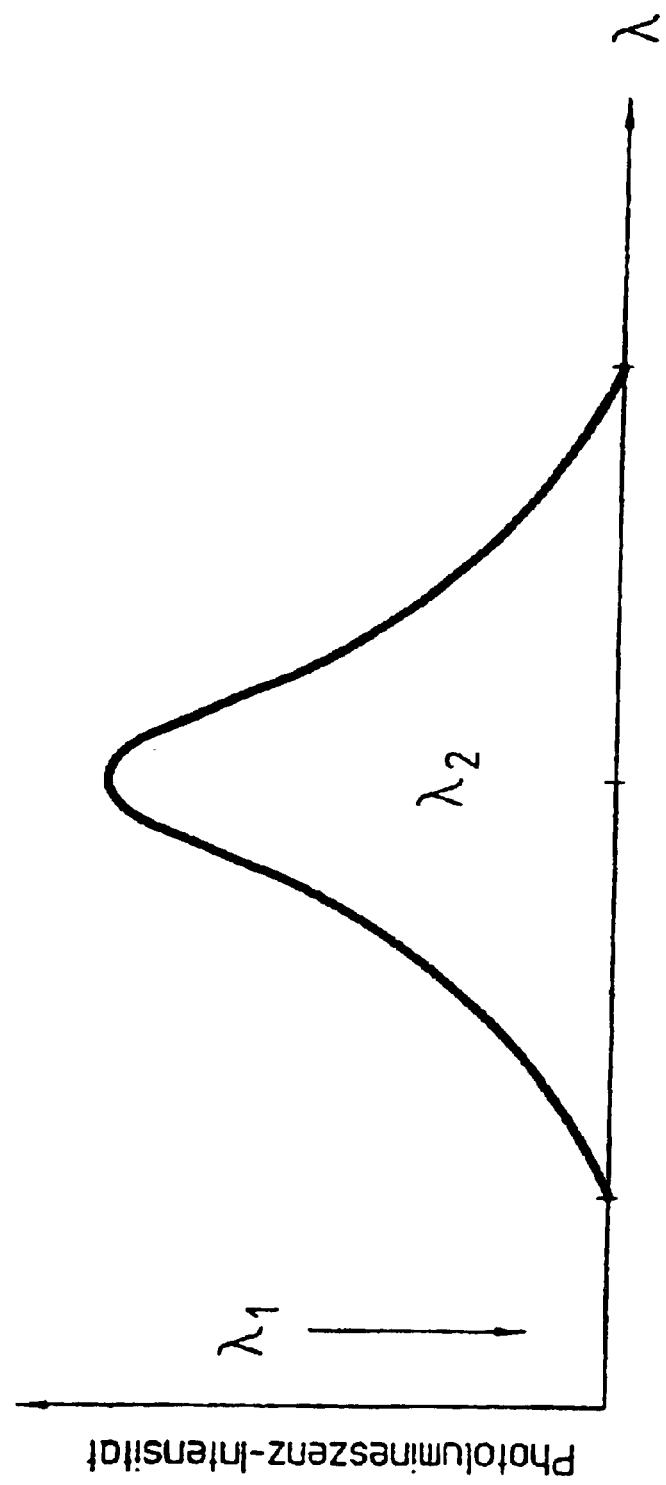
FIG. 3 is a graph illustrating the luminescence spectrum of porous silicon.

One example embodiment of the position measuring device of the present invention and of the material measure of the present invention used therein is illustrated in FIGS. 1-3. FIG. 1 schematically illustrates the scanning beam path in the position measuring device, which is configured as an incident-light system.

The position measuring device includes in a conventional manner a material measure 10 as well as a scanning unit 20, which is movable relatively thereto in measuring direction x. In the example embodiment illustrated in FIG. 1, a linear measuring system is represented. Rotating measuring systems may also be provided in accordance with the present invention. In addition, the position measuring device of the present invention and the material measure of the present invention may be used for determining the position of two machine parts that are movable with respect to one another.

According to one example embodiment of the present invention, material measure 10 includes a carrier substrate 11, which extends in measuring direction x of a linear measuring system. A track 15 having an incremental graduation that is scanned by scanning unit 20 to generate position-dependent incremental signals is arranged on the top side of carrier substrate 11, i.e., on the side facing scanning unit 20. A top view of material measure 10 including track 15 is illustrated in FIG. 2.

Track 15 having the incremental graduation includes subsections 12, 13 arranged in alternating sequence and having different optical properties. According to the present invention, first subsections 12 are formed as porous and photoluminescent subsections, whereas second subsections 13 are configured to be non-photoluminescent and are made of the unchanged material of corresponding carrier substrate 11, for example. As illustrated in FIG. 2, subsections 12, 13 of track 15 including the incremental graduation each have a narrow, almost line-like rectangular shape. The longitudinal side of the rectangle is perpendicular to direction x, in which track 15 extends on carrier substrate 11 and which is identical to measuring direction x. As is usual for incremental graduations, subsections 12, 13 are identical with regard to their geometric dimensions. Width b of subsections 12, 13 in measuring direction x finally determines graduation interval TP, which may be crucial for the position resolution of the position measuring device. Graduation interval TP is defined as the sum of widths b of two consecutive subsections 12, 13. In the example embodiment, a graduation interval TP=20 μm is provided.

In an example embodiment of the present invention, silicon, in the form of monocrystalline or polycrystalline silicon, may be used as a suitable material for carrier substrate 11. In particular, polycrystalline silicon may be used as the substrate material in the case of long measuring lengths that are necessary in some instances and correspondingly extended carrier substrates.

In the case of using silicon as the material of carrier substrate 11, photoluminescent subsections 12 may be formed from porous silicon having known luminescence properties. With regard to porous silicon, reference is also made here to the publication "The Structural and Luminescence Properties of Porous Silicon" by A. G. Cullis et al. in J. Appl. Phys. 82 (3), Aug. 1, 1997, pg. 909–965. If porous silicon is irradiated or excited by electromagnetic radiation of wavelength $\lambda_1$, this material emits electromagnetic radiation in the range of the wavelength $\lambda_2$. Typically, an excitation having wavelength $\lambda_1 \approx 370$ nm, i.e., in the ultraviolet spectral region, results.

Radiation or a luminescence band concentrated in the red-orange spectral region, i.e., $\lambda_2 \approx 600$ nm, is then emitted from the porous silicon. In principle, $\lambda_1 < \lambda_2$ applies to both wavelengths $\lambda_1$, $\lambda_2$. The spectral position of the emitted luminescence band also depends on the particular type of production of the porous silicon and may, therefore, be shifted with respect to the indicated region.

In an alternative example embodiment of the material measure of the present invention, it may also be provided to introduce a suitable luminescent dye, e.g., a rhodamine dye, having luminescence properties or a luminescence band suitable for the position measuring device, into first porous subsections 12. In this example embodiment, it may not be necessary to use is silicon as the material of carrier substrate 11. Rather, an alternative material may also be selected in which appropriate local porous subsections 12 are able to be formed in which a suitable luminescent dye is then inserted. $TiO_2$ or $ZrO_2$ are also suitable for this purpose.

In this context, the term "porous" means that pores that extend deep into the material are present in these subsections, so that there is a large internal surface in these subsections. The internal surface is enlarged approximately by a factor 10–1000 with respect to the geometric surface.

Also when using a silicon carrier substrate 11, porous silicon subsections 12 may also be provided with such a luminescent dye. As a result, a further intensified luminescence is able to be achieved in subsections 12, thereby resulting in a higher intensity of the scanning signals.

For producing porous silicon and this example embodiment of material measure 10 of the present invention, reference is made to the subsequent description of FIGS. 4a-4e. With regard to the relationship between excitation and luminescence wavelengths $\lambda_1$, $\lambda_2$, reference is made here to FIG. 3, in which this is graphically illustrated for porous silicon.

Although the example embodiment mentions photoluminescence, it should be understood that this only refers to the excitation of the appropriate subsections of the carrier substrate by electromagnetic radiation of a first wavelength and generation of electromagnetic radiation of a second wavelength. Therefore, fluorescence effects or similar effects of suitable materials may also be used in alternative example embodiments of the present invention.

Arranged on the side of scanning unit 20 of the position measuring device of the present invention is a light source 21, which may only emit radiation having necessary excitation wavelength $\lambda_1$ in the direction of material measure 10. The light source 21 may be a suitable LED, for example. Furthermore, it is also possible to additionally arrange a collimator optical system in front of appropriate light source 21.

Furthermore, scanning unit 20 includes a schematically indicated scanning plate 22. Scanning plate 22 includes a transparent carrier substrate 22.1, e.g., glass, on which a scanning graduation 22.2 is arranged in a conventional manner. In the example embodiment, the scanning graduation is provided on the side of carrier substrate 22.1 facing material measure 10. Scanning graduation 22.2 may, for example, be a conventional amplitude grating having alternating transparent and non-transparent subsections 22.2u, 22.2d, which are oriented on the material measure identically to subsections 12, 13. Alternatively, it is also possible to use phase gratings, etc.

Also schematically indicated in scanning unit 20 is an opto-electronic detector element 23, via which the scanning signals, which are modulated as a function of motion, are detected. A plurality of separate detector elements may also be used. It is also possible to use a so-called structured detector configuration including a plurality of identically configured detector elements of which the cophasal detector elements are each interconnected on the output side, etc.

Also arranged in the scanning beam path in front of detector element 23 is a filter element 24, which may be configured as a conventional cut-off filter. Its filter properties are selected such that it is possible to filter excitation wavelength $\lambda_1$, i.e., filter element 24 is non-transparent to excitation wavelength $\lambda_1$. This prevents possible scattered light from wavelength $\lambda_1$ from impinging on the detector elements(s), thereby undesirably influencing the signal modulation.

To circumvent the problem of scatter light, it may be provided to arrange in front of appropriate light source 21 another filter element 25, which is only transparent to wavelengths significantly smaller than luminescence wavelength $\lambda_2$, i.e., at least for an excitation wavelength $\lambda_1$. This may be useful, for example, in the case of light sources having additional emission lines to excitation wavelength $\lambda_1$, in particular in the region of luminescence wavelength $\lambda_2$. An appropriate filter element is indicated in FIG. 1 by a dotted line and is provided with reference numeral 25.

FIG. 1 merely illustrates the principle configuration of the position measuring device of present invention and of the material measure of the present invention. Other example embodiments, that provide various optical scanning variations, are also possible in connection with the present invention.

One method for producing an example embodiment of the material measure of the present invention based on a silicon carrier substrate having porous, photoluminescent subsections, is explained with reference to FIGS. 4a to 4e.

Figure 4A:
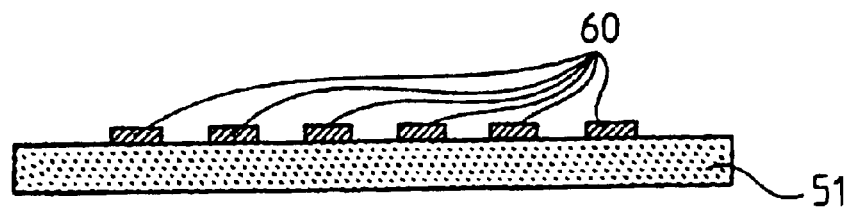
FIGS. 4a to 4e illustrate different method steps in the production of an example embodiment of the material measure of the present invention.

As illustrated in FIG. 4a, silicon carrier substrate 51 is first photolithographically patterned in a conventional manner. After the patterning step, ridges 60 of photoresist arranged periodically in measuring direction x remain on silicon carrier substrate 51.

Figure 4B:
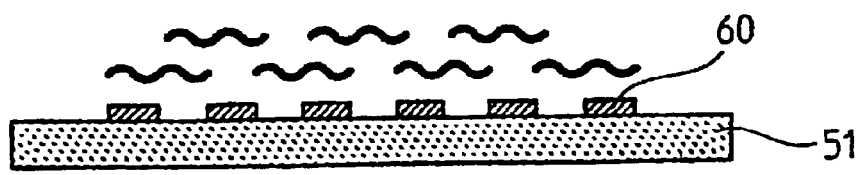

The photoresist is then tempered at about 150° C. as indicated in FIG. 4b.

Figure 4C:
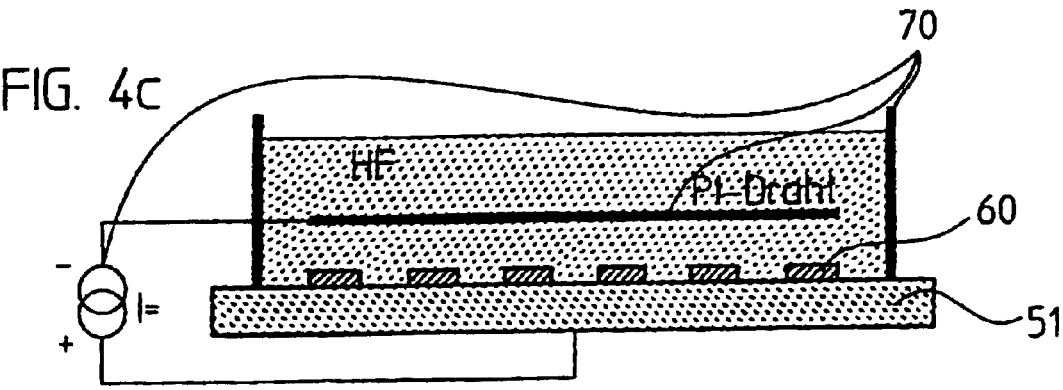

As illustrated in FIG. 4c, an electrochemical direct-current etching is performed in order to form the porous silicon having the necessary photoluminescence properties in the subsections of silicon carrier substrate 51 not covered by photoresist 60.

Figure 4D:
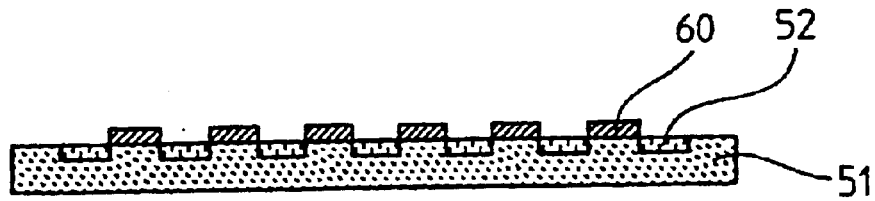
Figure 4E:
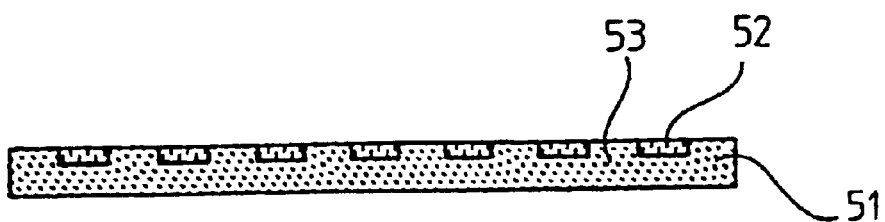

Subsections 52 of porous silicon produced by the etching process between remaining photoresist ridges 60 are illustrated in FIG. 4d.

In a final process step, photoresist 60 is removed from silicon carrier substrate 51, for example by using acetone. What remains is the material measure of the present invention illustrated in FIG. 4e, having photoluminescent subsections 52 and non-photoluminescent subsections 53 arranged alternately in the measuring direction.

In addition, the material measure of the present invention may be provided with a suitable, planar protective layer. This layer acts as protection against mechanical damage but may also be formed as a dereflection layer, etc.

In addition to the above-described method for producing porous silicon subsections 53, other methods may also be employed. In this respect, reference is made to chapter 11 of the abovementioned publication from A. G. Cullis et al.

What is claimed is:

1. A position measuring device, comprising
a material measure including a carrier substrate extending along a defined measuring direction and having a surface including at least one track having first porous subsections and second subsections, the first porous subsections and the second subsections alternatingly arranged and have different optical properties, the first porous subsections generating a photoluminescence wavelength $\lambda_2$, and the second subsections being non-photoluminescent; and a scanning unit movable relative to the material measure along said measuring direction and including at least one opto-electronic detector element via which scanning signals which are modulated as a function of relative movement between said material measure and said scanning unit are detected and a light source configured to apply radiation of a defined wavelength $\lambda_1$ to the material measure, the radiation from the light source configured to excite the photoluminescence in the first subsections of the material measure.

2. The position measuring device according to claim 1, wherein the carrier substrate includes silicon.

3. The position measuring device according to claim 2, wherein the carrier substrate includes one of monocrystalline and polycrystalline silicon.

4. The position measuring device according to claim 2, wherein the first subsections include porous, photoluminescent silicon.

5. The position measuring device according to claim 4, wherein the porous silicon includes a luminescence band in one of a red and an orange spectral region.

6. The position measuring device according to claim 1, wherein the first subsections include a luminescent dye.

7. The position measuring device according to claim 1, wherein the first and second subsections each includes a narrow rectangular shape, a longitudinal side of the rectangular shape oriented perpendicularly to the direction of the track.

8. The position measuring device according to claim 1, further comprising a planar protective layer.

9. The position measuring device according to claim 1, wherein the photoluminescent first porous subsections of the material measure include porous silicon.

10. The position measuring device according to claim 1, wherein the first and second subsections of the material measure form an incremental graduation.

11. The position measuring device according to claim 1, wherein the scanning unit further includes at least one scanning graduation.

12. The position measuring device according to claim 1, wherein a plurality of opto-electronic detector elements are configured as a structured detector configuration.

13. The position measuring device according to claim 1, further comprising an optical filter element arranged in a scanning beam path and before the at least one opto-electronic detector element, the optical filter element substantially non-transparent to the wavelength $\lambda_1$ emitted by the light source and transparent to the excited photoluminescence wavelength $\lambda_2$.

14. The position measuring device according to claim 13, wherein the filter element includes an edge filter.

15. The position measuring device according to claim 1, further comprising an additional optical filter element transparent to the wavelength $\lambda_1$ emitted by the light source configured to excite the photoluminescence and non-transparent to the excited photoluminescence wavelength $\lambda_2$, the additional optical filter element arranged upstream from the light source.

* * * * *